United States Patent
Muralidhar et al.

(10) Patent No.: US 12,335,067 B2
(45) Date of Patent: Jun. 17, 2025

(54) METHOD AND APPARATUS FOR CHANNEL PREDICTION FOR 5G UPLINK/DOWNLINK MASSIVE MIMO SYSTEM FOR OPEN RADIO ACCESS NETWORKS

(71) Applicant: Mavenir Systems, Inc., Richardson, TX (US)

(72) Inventors: Karthik Muralidhar, Bengaluru (IN); Logeshwaran Vijayan, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 260 days.

(21) Appl. No.: 17/940,128

(22) Filed: Sep. 8, 2022

(65) Prior Publication Data

US 2023/0078276 A1    Mar. 16, 2023

(30) Foreign Application Priority Data

Sep. 16, 2021    (IN) .............................. 202121041904

(51) Int. Cl.
*H04L 25/02*    (2006.01)
*H04B 7/0417*    (2017.01)
(Continued)

(52) U.S. Cl.
CPC ....... *H04L 25/0224* (2013.01); *H04B 7/0456* (2013.01); *H04B 7/0639* (2013.01); *H04L 25/025* (2013.01); *H04B 7/0417* (2013.01)

(58) Field of Classification Search
CPC ............... H04L 25/0224; H04L 25/025; H04L 25/0222; H04L 25/0228; H04L 25/022;
(Continued)

(56) References Cited

U.S. PATENT DOCUMENTS

2002/0024975 A1\*  2/2002  Hendler ................. H04B 7/086
                                                              370/537
2008/0240260 A1\* 10/2008  Heidari .............. H04B 17/3911
                                                              375/341
(Continued)

OTHER PUBLICATIONS

Anil Umesh, Tatsuro Yajima, Toru Uchino, and Suguru Okuyama, "Overview of O-RAN fronthaul specifications," NTT Docomo Technical Journal, vol. 21, No. 1, Jul. 2019.
(Continued)

*Primary Examiner* — Jung H Park
(74) *Attorney, Agent, or Firm* — Ruggiero McAllister & McMahon LLC

(57) ABSTRACT

A method for channel prediction for uplink (UL) and downlink (DL) massive Multiple Input Multiple Output (MIMO) systems for Open Radio Access Network (O-RAN) fronthaul Split 7.2 networks enables prediction of a channel that is seen by the UL slot. The pre-processing matrix is computed by the distributed unit (DU) based on this predicted channel and sent to the radio unit (RU) for minimizing the effects of channel aging. A channel corresponding to sounding reference signal (SRS) symbol closest to uplink slot being decoded can be predicted from previous SRS symbols and can be used as a combining matrix. Alternatively, the channel of the uplink slot itself can be predicted from past SRS symbols, and a combining matrix can be generated based on the predicted channel.

5 Claims, 8 Drawing Sheets

(51) Int. Cl.
*H04B 7/0456* (2017.01)
*H04B 7/06* (2006.01)

(58) Field of Classification Search
CPC .. H04B 7/0456; H04B 7/0639; H04B 7/0417; H04B 7/0413
See application file for complete search history.

(56) References Cited

U.S. PATENT DOCUMENTS

| | | | |
|---|---|---|---|
| 2018/0287673 A1* | 10/2018 | Chang | H04L 25/0224 |
| 2020/0099434 A1 | 3/2020 | Wang et al. | |
| 2021/0219161 A1* | 7/2021 | Hu | H04W 24/08 |
| 2022/0279535 A1* | 9/2022 | Tsui | H04L 25/0222 |

OTHER PUBLICATIONS

GSTR-TN5G, "Transport network support of IMT-2020/5G," ITU-T, Feb. 2018.
Jay Kant Chaudhary, Atul Kumar, Jens Bartelt, and Gerhard Fettweis, "C-RAN Employing xRAN Functional Split: Complexity Analysis for 5G NR Remote Radio Unit," European Conference on Networks and Communications (EuCNC), vol. 45, No. 9, Jun. 2019.
Line M. P. Larsen, Aleksandra Checko, and Henrik L. Christiansen, "A Survey of the Functional Splits Proposed for 5G".
Salil Kashyap, Christopher Molln, Emil Bjrnson, and Erik G. Larsson, "Performance analysis of (TDD) massive MIMO with Kalman channel prediction," IEEE International Conference on Acoustics, Speech and Signal Processing (ICASSP), Jun. 2017.
Jide Yuan, Hien Quoc Ngo, and Michail Matthaiou, "Machine Learning-Based Channel Estimation in Massive MIMO with Channel Aging," IEEE Transactions on Wireless Communications, vol. 19, No. 5, May 2020.
Haifan Yin, Haiquan Wang, Yingzhuang Liu, and David Gesbert, "Addressing the Curse of Mobility in Massive MIMO With Prony-Based Angular-Delay Domain Channel Predictions," IEEE Journal on Selected Area in Communications, vol. 38, No. 12, Dec. 2020.
Soumendu Ghosh and RibhuChopra, "Training for massive MIMO systems with non-identically aging user channels," Physical Communications, vol. 35, No. 13, Aug. 2019.
www.sharetechnote.com/html/5G/5G tdd UL DL configurationCommon.html.
Yezi Huang, Wanlu Lei, Chenguang Lu, and Miguel Berg, "Fronthaul Functional Split of IRC-Based Beamforming for Massive MIMO Systems," IEEE Vehicular Technology Conference, pp. 1-5, 2019.
3GPP TS 38.213, "Physical Layer Procedures for Control," 3GPP, V15.13.0, Mar. 2021.
Y. Huang, C. Lu, M. Berg and P. dling, "Functional Split of Zero-Forcing Based Massive MIMO for Fronthaul Load Reduction," IEEE Access, vol. 6, 2018.
3GPP TS 38.211, "Technical Specification Group Radio Access Network: Physical Channels and Modulation," 3rd Generation Partnership Project, V15.8.0, Dec. 2019.
Steven Kay, "Fundamentals of Statistical Processing, vol. 1—Estimation Theory," Prentice Hall, May 1993.
https://en.wikipedia.org/wiki/Whittaker-Shannon interpolation formula.
Chester Sungchung Park, Y.-P. Eric Wang, George Jngren, and David Hammarwall, "Evolution of uplink MIMO for LTE-advanced," IEEE Communications Magazine, vol. 49, No. 2, Feb. 2011.
Xiaolin Hou, Zhan Zhang, and Hidetoshi Kayama, "DMRS Design and Channel Estimation for LTE-Advanced MIMO Uplink," IEEE Vehicular Technology Conference, Sep. 2009.
Q. H. Spencer, C. B. Peel, A. L. Swindlehurst, and M. Haardt "An introduction to the multi-user MIMO downlink," IEEE Communications Magazine, vol. 42, No. 10, Oct. 2004.
3GPP TR 38.901, "Technical Specification Group Radio Access Network;Study on Channel Model for Frequencies from 0.5 to 100 GHZ, Release 14" 3rd Generation Partnership Project, V14.3.0, Dec. 2017.
Andreas Mader, H. Puder, and G. Schmidt, "Step-size control for acoustic echo cancellation filters—an overview," Signal Processing, vol. 80, 2000.
A. Bhandari and P. Marziliano, "Fractional Delay Filters Based on Generalized Cardinal Exponential Splines," IEEE Signal Processing Letters, vol. 17, No. 3, Mar. 2010.
P. P. Vaidyanathan, "The Theory of Linear Prediction," Morgan and Claypool Publishers, Feb. 2008.
K. Manolakis, S. Jaeckel, V. Jungnickel, and V. Braun, "Channel Prediction by Doppler-Delay Analysis and Benefits for Base Station Cooperation," IEEE Vehicular Technology Conference, 2013.
Haykin "Adaptive Filter Theory," Pearson Publishers, Feb. 2014.
Extended European Search Report for corresponding European application EP22195823.4, 7 pages, dated Feb. 6, 2023.
Chang Wenting et al. "A Prefiltering C-RAN Architecture with Compressed Link Data Rate in Massive MIMO", 2016 IEEE 83rd Vehicular Technology Conference (VTC Spring), IEEE, May 15, 2016.
Truong Kien T et al.: "Effects of channel aging in massive MIMO systems",Journal of Communications and Networks, New York, NY, USA,IEEE, US, vol. 15, No. 4, Aug. 1, 2013.
Muralidhar Karthik et al. Linear Channel Prediction-based Receiver for Split 7.2 Uplink Massive MIMO, 2022 IEEE 33rd Annual International Symposium on Personal, Indoor and Mobile Radio Communications (PIMRC), IEEE, Sep. 12, 2022.

* cited by examiner

METHOD AND APPARATUS FOR CHANNEL PREDICTION FOR 5G UPLINK/DOWNLINK MASSIVE MIMO SYSTEM FOR OPEN RADIO ACCESS NETWORKS

BACKGROUND OF THE DISCLOSURE

1. Field of the Disclosure

The present disclosure relates to a method and apparatus for Radio Access Networks (RANs), and relates more particularly to a method and apparatus for mitigating channel aging in Open RAN (O-RAN).

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital costs (CAPEX) and operating costs (OPEX) of RAN deployment and make the solution scalable and easy to upgrade.

Cloud-based Radio Access Networks (C-RANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the Radio Unit (RU), sometimes referred to as Remote Radio Unit (RRU).

The O-RAN architecture is a Cloud-based architecture specified by the O-RAN Alliance. The components of the O-RAN architecture include, e.g., the Service Management and Orchestrator (SMO) Framework, the Non-Real Time (Near-RT) Radio Intelligent Controller (RIC), the Near-Real Time (Near-RT) Radio Intelligent Controller (RIC), the O-RAN Centralized Unit (O-CU), the O-RAN Distributed Unit (O-DU), and the O-RAN Radio Unit (O-RU). The data between O-DU and O-RU is sent over the open fronthaul interface.

As noted above, C-RAN connects many RUs, each catering to a 4G/5G cell, to a central baseband processing unit via a fronthaul. This provides performance benefits via inter-cell and inter-frequency co-ordination and also cost benefits through resource pooling and reduced installation space. However, the common public radio interface (CPRI) used in C-RAN does not sufficiently prescribe specifications for fronthaul interfaces, thereby resulting in different specifications for different vendors. The drawback is lack of inter-operability between equipment from different vendors. The Open RAN (O-RAN) fronthaul specifications were formulated against this background and aim to help make multi-vendor RAN a reality. Furthermore, due to bandwidth limitations of the fronthaul, O-RAN includes different fronthaul functional splitting of the physical layer, e.g., fronthaul Split 7-2 and Split 7-3.

As shown in FIG. 1, in Split 7-2 the RU 101 (handling lower physical layer (LPHY)) receives analog signals from radio frequency (RF) units, converts the signals to digital signals (shown by the function block 1001 designated "RF/ADC", indicating conversion of analog signals from the RF units to digital signals), does time domain processing, applies FFT (as well as performing cyclic prefix (CP) removal) and sends the frequency domain signal to the DU, over the fronthaul 103. Additional functions shown on the RU side include: SRS over all antennas; combining matrix buffer; and combining matrix application on UL. The DU 102 processes signals of the RUs, e.g., RU 101. Functions shown on the DU side include: SRS processing for channel estimation, user pairing and weight computation; rest of L1 processing; and L2 processing. In uplink massive MIMO, each RU is equipped with a large number (represented by variable $N_R$) of antennas, e.g., typically upwards of 64. In uplink multi-user-MIMO (MU-MIMO), $N_U$ number of user equipments (UEs) transmit on the same time-frequency resource. The fronthaul 103 between the RU 101 and DU 102 has limited bandwidth and what is sent over it has to be designed judiciously. The RU combines the $N_R$ values received over NR antennas per subcarrier (after FFT) into $M \ll N_R$ values by applying a $M \times N_R$ combining matrix and sends only M values per subcarrier over the fronthaul to the DU. The DU decodes the $N_U$ UEs from these M values. The combining matrix for an uplink slot needs to be informed by DU a priori before the start of the reception of an uplink slot at RU. This processing is for physical uplink shared channel (PUSCH) channel. However, for sounding reference signal (SRS) channel, all $N_R$ values are sent to DU for every subcarrier. In Split 7-3, there is no fronthaul and all processing (RF/ADC conversion; FFT and CP removal; UL MU-MIMO decoder processing; rest of L1 processing; and L2 processing) is in one place, as shown in the upper portion of FIG. 1.

For mobility use cases (typically 30 km/hr), using conventional methods for the Split 7.2 architecture results in a loss of performance in comparison to Split 7.3 method. This is because of the channel aging issue associated with the combining matrix, which is discussed in further detail below. Accordingly, there is a need to mitigate the channel aging issue for the Split 7.2.

SUMMARY OF THE DISCLOSURE

An example embodiment of the apparatus and method according to the present disclosure provides a mechanism to predict the channel at desired time instant in massive MIMO systems (e.g., utilizing O-RAN architecture) so that the precoding matrix in the downlink and combining matrix in the uplink are derived from it to mitigate the channel aging.

An example embodiment of the method according to the present disclosure provides a training period in which the prediction coefficients are obtained by training with the latest Sounding Reference Signal (SRS) symbol as the desired channel and the past SRS symbols as the inputs to the prediction module. Following the training period, the prediction coefficients are used to predict the future SRS symbols by using the past SRS symbols. The predicted SRS symbol is used to derive the combining matrix to be applied in RU for decoding the UL slot close to the slot containing SRS symbols.

An example embodiment of the method according to the present disclosure includes: i) predicting the channel between the periodic SRS symbols, and using the predicted channel to decode the UL slots anywhere between the slots containing SRS symbols, and ii) reconstructing the predicted channel between two SRS channels/symbols.

In an example embodiment of the method according to the present disclosure, the channel of intra-site interferers is predicted and used to perform interference whitening for decoding the desired users.

An example method according to the present disclosure is applicable for precoding in the DL as well using the predicted channels.

According to an example embodiment, the method according to the present disclosure can be implemented at least in part using adaptive filters.

According to an example embodiment, the method according to the present disclosure can be implemented at least in part using Kalman filters.

According to an example method according to the present disclosure, SRS symbols are used to determine speed and replace the learning phase of linear channel prediction.

An example method according to the present disclosure utilizes Delay-Doppler domain to perform channel prediction of time domain multipath taps, thereby enabling prediction of channels in a future SRS/PUSCH symbol in any RB, which method is conducive for sub-band SRS scheduling and increases the SRS capacity.

DETAILED DESCRIPTION

The present disclosure provides an improved mechanism to overcome the loss of performance arising from the channel aging issue. An example embodiment of a method according to the present disclosure, based on linear channel prediction, ensures that Split 7.2 and 7.3 achieve substantially the same performance.

The present disclosure provides a mechanism for channel prediction for uplink and downlink massive MIMO systems for O-RAN fronthaul Split 7.2 networks. In traditional networks, which include co-located RU and DU, although the advantages of ORAN fronthaul split 7.2 are not available, the channel estimates can be based on the DMRS present in the UL slots, and hence the channel aging problem is not an issue. On the other hand, in O-RAN fronthaul Split 7.2 networks, because of the separation of RU and DU, UL slots have to be pre-processed in the RU before sending to DU to minimize the FH requirements. This means the last estimated SRS channel is used in the DU to determine the combining weights which are sent to RU for pre-processing the incoming UL slots, thereby resulting in performance degradation due to channel aging.

In the present disclosure, channel prediction techniques are provided to predict the channel that is seen by the UL slot. The pre-processing matrix is computed by the DU based on this predicted channel and sent to RU for minimizing the effects of channel aging. In an example embodiment, a channel corresponding to SRS symbol closest to uplink slot being decoded is predicted from previous SRS symbols and is used as a combining matrix. In yet another example embodiment, the channel of the uplink slot itself is predicted from past SRS symbols, and a combining matrix is built based on the predicted channel. Low-complexity, implementation-friendly versions of the linear predictor is implemented using adaptive filters, Kalman filters and/or estimating speed of users via SRS symbols.

Figure 1:
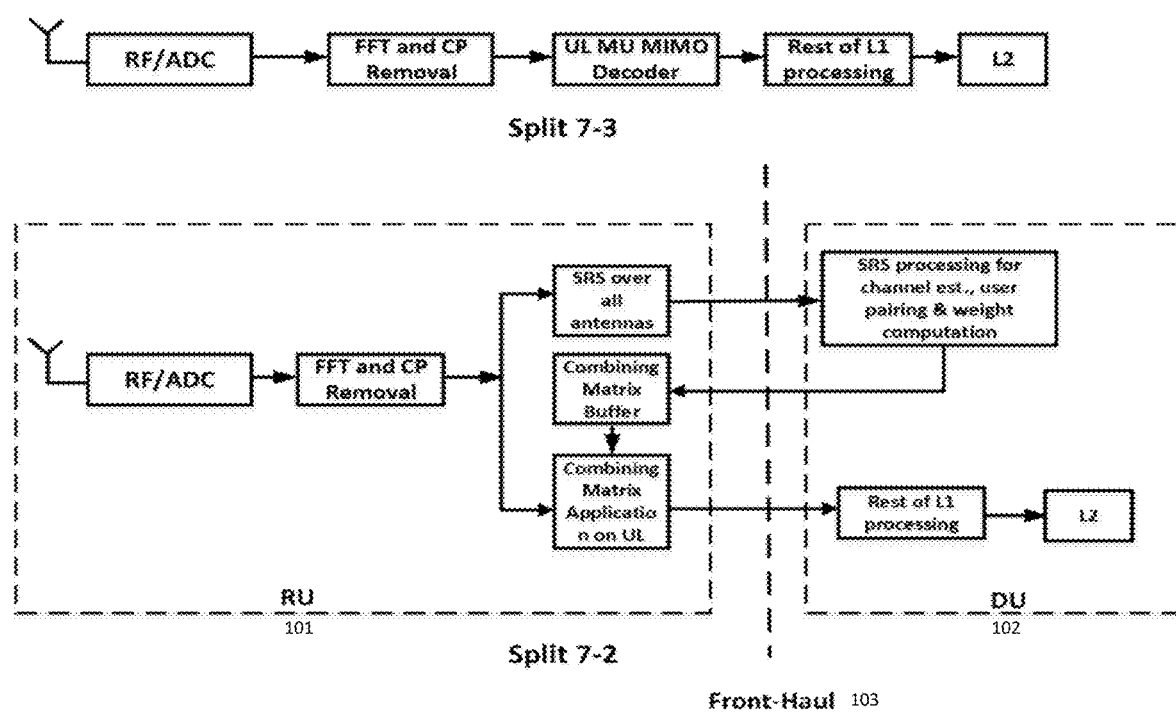
FIG. 1 illustrates the architecture of O-RAN Split 7.3 and Split 7.2.
Figure 2:
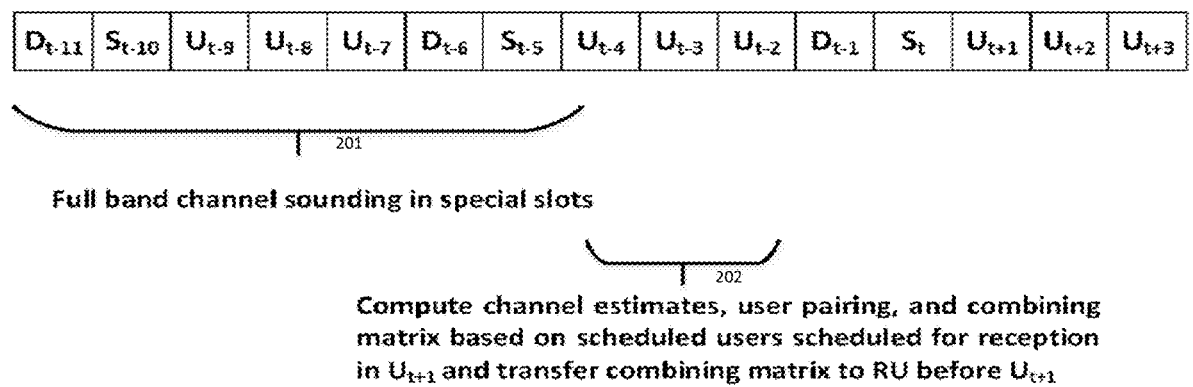
FIG. 2 illustrates various processing and scheduling associated with reception of an uplink slot in a DSUUU slot pattern.

As an example, a pattern of repeated slots is considered, denoted by DSUUU, where D, S and U are downlink, special, and uplink slots, respectively. A downlink slot has only downlink OFDM symbols, and an uplink slot has only uplink OFDM symbols. A special slot has a combination of downlink, flexible and uplink OFDM symbols, in that order. The quantities $D_t$, $S_t$, $U_t$ denote downlink, special and uplink slots, respectively, at a slot index t. The uplink OFDM symbols towards the end of a special slot carry SRS of various multiplexed users across the entire bandwidth. As an example, 30 kHz subcarrier spacing is used, which means a slot is 0.5 ms in duration and SRS periodicity is five slots or 2.5 ms. Referring to the DSUUU slot pattern shown in FIG. 2 (which is repeated three times in FIG. 2), in order to prepare for the reception of uplink Slot $U_{t+1}$ after the special slot $S_{t-5}$, the DU computes the channel estimates of all users across the entire bandwidth. The DU then decides which $N_U$ users need to be paired for transmission in the same time-frequency resource, and then computes the combining matrix to receive these $N_U$ users over a selected RB in Slot $U_{t+1}$. This combining matrix is sent to the RU before the reception of $U_{t+1}$. As shown in FIG. 2, the sequence of first seven slots, collectively referenced as 201, is used for full band channel sounding in special slots. Also shown in FIG. 2 is a second sequence of UUU slots, collectively referenced as 202, which slots are used for computing channel estimates, user paring and combining matrix based on scheduled users who are scheduled for reception in $U_{t+1}$ and transfer combining matrix to the RU before $U_{t+1}$.

Figure 3:
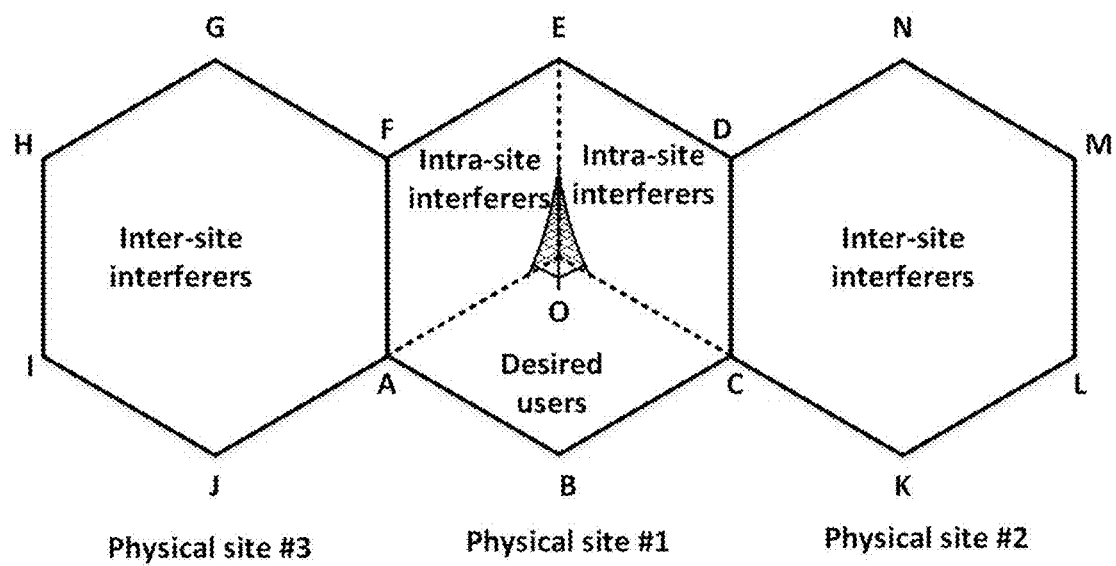
FIG. 3 illustrates three physical sites and their cells/sectors classified as desired, intra-site and inter-site cells/sectors.

In FIG. 3, three physical sites are shown, ABCDEF, CKLMND and IJAFGH. Each physical site is comprised of three sectors, e.g., as shown by the physical site ABCDEF in FIG. 3, which has three sectors OABC, OCDE and OEFA. Each sector is considered to be a cell, so "sector" and "cell" will be used interchangeably. The base station (RUs and DU) for the physical site ABCDEF resides at the location indicated as O in FIG. 3. The DU receives signals from three RUs, each corresponding to a sector/cell within the physical site ABCDEF. Signals of users in sector/cell OABC (referred to as desired users) received at the base station at O have interference from users in other sectors/cells (OCDE and OEFA) of the same physical site, which interference is called intra-site interference. The desired user also experiences interference from users in sectors/cells of other physical cell sites (CKLMND and IJAFGH), which interference is called inter-site interference. Because the DU of a physical cell site has access to scheduling information of users in all the sectors/cites belonging to the same physical site, the DU at O can estimate the channels of the desired users and intra-site interferers, but the DU can't estimate the channels of inter-site interferers. Intra-site and inter-site interferers are collectively abbreviated as ICI (Inter-cell interference). The desired user at the center of a cell will have negligible ICI, which can be neglected, while the desired user at the cell edge will experience significant ICI. In the present disclosure, the case of absence of ICI (e.g., for cell-center desired user) is first analyzed, and then the case of presence of ICI (e.g., for cell-edge desired user) is analyzed.

Brief explanation of notations is provided here. The quantity E {x} denotes the expectation of x. The quantity I represents an Identity matrix of appropriate dimension. The estimate of x is denoted by x̂. Matrices and vectors will be represented by bold uppercase and lowercase, respectively, while scalars are denoted by normal fonts. Matlab notation is used to access parts of matrices/vectors. The $(a,b)^{th}$ element of a matrix X is denoted by X(a,b). The $p^{th}$ element of a vector x is denoted by x(p). The quantity $\lfloor x \rfloor$ denotes a floor operation on x, i.e., it denotes the greatest integer less than x. As an example, $\lfloor 4.19 \rfloor = 4$. The quantity x* is the conjugate of x.

System Model in the Absence of ICI:

For this scenario, we are concerned with demodulating OFDM data symbols in uplink Slot $U_{tm+i}$ which is i slots away from nearest special slot $S_{tm}$ that contains the SRS. Let the received signal in a given OFDM data symbol in uplink Slot $U_{tm+1}$ across the $N_R$ antennas on a given subcarrier s in a given Resource block (RB) r be denoted by the $N_R \times 1$ vector y (for the sake of simplicity, we do not parametrize y, H, x and n by the OFDM data symbol index and Parameters s, r, and $t_m+i$), $$y = Hx + n \quad (1)$$

where H is a $N_R \times N_U$ channel matrix of desired users, x is $N_U \times 1$ vector of desired users, n is additive white Gaussian noise (AWGN) whose covariance matrix is $C = E\{nn^H\} = \sigma I$. The $N_R \times N_U$ channel matrix, $H_{DMRS}$, is the average of all H across subcarriers corresponding to the given RB r and the first demodulation reference symbol (DMRS) in an uplink Slot $U_{tm+i}$. Let the $N_R \times N_U$ channel matrix corresponding to a given Subcarrier s in the given RB r in an SRS symbol in special Slot $S_{tm-5}$ (SRS periodicity is five slots) be denoted by $H_1$. The quantity $H_{SRS}$ denotes the average of all $H_1$ across subcarriers in the given RB r. The estimate of channel matrix H for all subcarriers in the given RB r and all OFDM data symbols in uplink Slot $U_{tm+i}$ is either $H_{DMRS}$ or $H_{SRS}$.

Two points should be noted regarding the above-described system model in the absence of ICI. First, in 5G $N_R$, an RB is a set of 12 subcarriers. In the present disclosure, an RB is a set of 12 subcarriers in any OFDM symbol (as per Section 4.4.4.1 in 3GPP TS 38.211, "Physical Channels and Modulation," 3GPP, V15.8.0, December 2019). The RBs in any OFDM symbol are indexed from r=0, . . . , 49, as we use 50 RBs across the channel bandwidth in the present disclosure. Second, channel estimates for OFDM data symbols in any subcarrier can be interpolated from channel estimates of all DMRS in the slot for that subcarrier. However, for the sake of simplicity, channel estimates of all OFDM symbols in the slot can be based on the channel estimate derived in the first DMRS only.

The O-RAN fronthaul Split 7.2 and Split 7.3 receivers are defined as follows:

Split 7.3: An estimate of x is computed as $\hat{x} = (H^H_{DMRS} H_{DMRS} + \sigma^2)^{-1} H^H_{DMRS} y$ Split 7.2: An $M \times N_R$ combining matrix $W_{RU}$ is used by RU to compress y.

What we get at the DU is $$\bar{y} = \bar{H}x + \bar{n} \quad (2)$$

where $\bar{y} = W_{RU} y$, $\bar{H} = W_{RU} H$ and $\bar{n} = W_{RU} n$. We use one combining matrix for all subcarriers in an RB across the OFDM data symbols in Uplink slot $U_{tm+i}$. At the DU, the effective channel estimate used for all subcarriers in the given RB r across OFDM data symbols in uplink Slot $U_{tm+i}$ is $\bar{H} = W_{RU} H_{DMRS}$ and the covariance matrix seen by DU is $\bar{C} = E\{\bar{n}\bar{n}^H\} = \sigma^2 W_{RU} W_{RU}^H$. The DU receives $\bar{y}$ and computes an estimate of x as $\hat{x} = W_{DU} \bar{y}$ where the minimum mean square error (MMSE) solution for $W_{DU}$ is given as:

$$W_{DU} = (\bar{H}_{DMRS}^H \bar{C}^{-1} \bar{H}_{DMRS} + I)^{-1} \bar{H}_{DMRS}^H \bar{C}^{-1}. \quad (3a)$$

or the alternate form $$W_{DU} = \bar{H}_{DMRS}^H (\bar{H}_{DMRS} \bar{H}_{DMRS}^H + \bar{C})^{-1} \quad (3b)$$

Note that if $W_{RU} = H_{DMRS}^H$ (conjugate combining matrix or CCM), we have $$W_{DU} = (H^H_{DMRS} H_{DMRS} + \sigma^2 I)^{-1} \quad (4)$$

which translates to estimating x as.

$$\hat{x} = W_{DU} W_{RU} y = (H^H_{DMRS} H_{DMRS} + \sigma^2 I)^{-1} H^H_{DMRS} y \quad (5)$$

which is the MMSE of estimate x based on y. One can select $W_{RU} = (H^H_{DMRS} H_{DMRS} + \sigma^2 I)^{-1} H^H_{DMRS}$, called as MMSE combining matrix or MMSE-CM. In this case, no processing is required in DU and $W_{DU} = I$.

In this section, signal-to-interference-plus-noise ratio (SINR) computation will be discussed. If an estimate of $\hat{x}$ is computed as $\hat{x} = Wy = \tilde{H}x + \tilde{n}$, where $\tilde{H} = WH$ and $\tilde{n} = Wn$, the SINR of the ith user is given as $$SINR_i = \frac{|\tilde{H}(i,i)|^2}{\sum_{j=1, j \neq i}^{N_U} |\tilde{H}(i,j)|^2 + \sigma^2 \sum_{j=1}^{N_U} |W(i,j)|^2} \quad (6)$$

Furthermore, we define the spectral mean of a set of SINRs as follows. Suppose there are $N_U$ SINRs, i.e., $SINR_1, \ldots, SINR_{NU}$, the spectral mean (SM) SINR of these SINRs is given by $$SINR_{SM} = \sqrt[N_U]{(1 + SINR_1) \ldots (1 + SINR_{N_U})} - 1. \quad (7)$$

The $SINR_{SM}$ of a set of $N_U$ SINRs is the SINR which will give the same spectral efficiency (as the sum of spectral efficiencies of the corresponding $N_U$ SINRs) if each of the $N_U$ SINRs is replaced by $SINR_{SM}$.

The above-noted MMSE equation (5) is implementable in the Split 7.3 architecture as the uplink Slot $U_t$ is decoded after being received over air and the Split 7.3 architecture can compute $H_{DMRS}$. While the CCM and MMSE-CM methods also reduce to the MMSE solution, CCM and MMSE-CM can't be implemented in Split 7.2. This is because the combining matrix $W_{RU}$ that needs to be sent to RU before the uplink Slot $U_{tm+i}$ can't be based on $H_{DMRS}$ as DU is yet to have access to it (one needs uplink Slot $U_{tm+i}$ to compute it). As an alternative, approximations of CCM and MMSE-CM methods can be used in the context of Split 7.2. The approximations of the two methods are obtained by replacing $H^H_{DMRS}$ with $H^H_{SRS}$ in $W_{RU}$ and are given by the following:

CCM approximation to Split 7.2: The combining matrix is $W_{RU}=H_{SRS}^H$. The quantity $W_{DU}$ is as per above-noted equation (3).

MMS1E-CM approximation to Split 7.2: The combining matrix is $W_{RU}=(H^H_{SRS} H_{SRS}+\sigma^2 I)^{-1} H^H_{SRS}$. The quantity $W_{DU}$ is the Identity matrix I.

Note that the approximations of CCM and MMSE-CM to Split 7.2 will incur a loss of performance relative to Split 7.3 (which uses MMSE method) at high speeds. At high speeds, there is a significant difference between $H_{SRS}$ and $H_{DMRS}$ as they are channel estimates of channels that are 5+i slots apart ($S_{tm-5}$ and $U_{tm+i}$, respectively). This is called channel aging effect and depends on Doppler spread fp. The Doppler spread depends on speed of the UE v and carrier frequency $f_C$ as $f_D=f_C$ (v/c), in which c is the speed of light. Accordingly, at high speeds Split 7.2 CCM and MMSE methods will have a loss of performance compared to Split 7.3. Split 7.3 can be treated as the upper bound for Split 7.2. At low speeds, Split 7.2 tends to be the same as Split 7.3 or the MMSE method as the channel aging is very minimal. One of the goals of the method according to the present disclosure is how to design the combining matrices such that the gap between a Split 7.2 and 7.3 is reduced.

An example embodiment of the method according to the present disclosure uses linear channel prediction (LCP) to address this loss of performance of Split 7.2 relative to Split 7.3 due to channel aging. The combining matrix has to be sent to RU before the reception of uplink Slot $U_{tm+i}$. The DU can use SRS channel estimates of Slots $S_{tm-5}$ and the ones before that to build the combining matrix. Note that the DU can't use SRS slot $S_{tm}$ due to latency requirements and the SRS slot being close to uplink slot $U_{tm+i}$. The LCP method in the DU uses channel estimates of SRS in Slots $S_{tm-5}$ and ones before that to predict an estimate of $H_{DMRS}$ (that corresponds to $U_{tm+i}$) as $\hat{H}_{DMRS}^H$ and uses this in CCM-LCP (Split 7.2) and MMSECM-LCP (Split 7.2) methods as $W_{RU}=\hat{H}_{DMRS}^H$ and $W_{RU}=(\hat{H}_{DMRS}^H \hat{H}_{DMRS}+\sigma^2 I)^{-1}\hat{H}_{DMRS}^H$, respectively. The quantity $W_{DU}$ is as per above-noted equation (3) for CCM-LCP (Split 7.2) and the Identity matrix I for MMSE-CM-LCP (Split 7.2).

LCP methods for Split 7.2 in the absence of ICI will be discussed below. LCP is generally used to predict future values of a channel based on present and past values. The LCP equation can be written as $S_u\rho_u=d_u$ (will be defined later). LCP operates in two modes. First, in learning/training mode, we populate the input matrix $S_u$ and desired vector $d_u$. Once populated we determine the LCP coefficient vector $\rho_u$. Next is the prediction mode, where we populate the input Matrix $S_u$ based on present and past values and use the already-learnt LCP coefficient vector $\rho_u$ to compute/predict vector of future channel values $d_u$. There are two methods of LCP for Split 7.2 that will be discussed below.

LCP Method 1: This method uses channel estimates of only SRS symbols to learn the LCP coefficients. Define $\theta_{i,t,r,a}$ as the channel estimate of User i in RB r, antenna a and channel corresponding to SRS symbol in a special Slot $S_t$. Likewise, $\omega_{i,t,r,a}$ as the channel estimate of User i in RB r, antenna a and channel corresponding to the first DMRS symbol in an uplink Slot $U_t$. The quantities $\theta_{i,t,r,a}$ and $\omega_{i,t,r,a}$ can be considered as the average of the channel values of all subcarriers in a RB. We now discuss the learning/training mode for User u at Special slot $S_t$. We now build an input matrix $S_{r,t,u}$ as $$S_{r,t,u} = \begin{bmatrix} \theta_{u,t-5-5(o_t-1),r,1} & \cdots & \theta_{u,t-10,r,1} & \theta_{u,t-5,r,1} \\ \theta_{u,t-5-5(o_t-1),r,2} & & \theta_{u,t-10,r,2} & \theta_{u,t-5,r,2} \\ \vdots & \vdots & \vdots & \vdots \\ \theta_{u,t-5-5(o_t-1),r,N_R} & \cdots & \theta_{u,t-10,r,N_R} & \theta_{u,t-5,r,N_r} \end{bmatrix} \quad (8)$$

and desired/predicted vector $d_{r,t,u}$ as $$d_{r,t,u} = \begin{bmatrix} \theta_{u,t,r,1} \\ \theta_{u,t,r,2} \\ \vdots \\ \theta_{u,t,r,N_R} \end{bmatrix}. \quad (9)$$

The preliminary LCP equation is $S_{r,t,u}\rho_u=d_{r,t,u}$. This corresponds to using past values in RB r to predict future values in same RB r. In the preliminary LCP equation, one can use values in RBs $r-o_f, \ldots, r, \ldots, r+o_f$ to predict future values in RB r where $o_f$ is the frequency-domain prediction order (either side of $RB_r$). The equation would then be $[S_{r-o_f,t,u}^T \ldots S_{r,t,u}^T \ldots S_{r+o_f,u}^T]^T \rho_u = d_{r,t,u}$ Frequency-domain prediction order needs to be employed if there is correlation across RBs in frequency domain and this will generally exist for low delay spreads which result in frequency-selectivity across larger number of RBs in frequency domain. However, for the sake of simplicity, we consider $o_f=0$ in the present disclosure. Note that each row of the input matrix $S_{r,t,u}$ has or channel estimates and we say that order of prediction is $O_t$. Each row of $S_{r,t,u}$ corresponds to an unique antenna and RB r. One can stack $S_{r,t,u}$ and $d_{r,t,u}$ for various time instants $t=t_1, \ldots, t_n$ as $$S_{r,u} = \begin{bmatrix} S_{r,t_1,u} \\ \vdots \\ S_{r,t_u,u} \end{bmatrix}, d_{r,u} = \begin{bmatrix} d_{r,t_1,u} \\ \vdots \\ d_{r,t_u,u} \end{bmatrix} \quad (10)$$

Furthermore, we can stack the various $S_{r,u}$ and $d_{r,u}$ for RBs $r_1, \ldots, r_A$ as $$S_u = \begin{bmatrix} S_{r_1,u} \\ \vdots \\ S_{r_A,u} \end{bmatrix}, d_u = \begin{bmatrix} d_{r_1,u} \\ \vdots \\ d_{r_A,u} \end{bmatrix}. \quad (11)$$

We now have the relation $$S_u \rho_u = d_u \quad (12)$$

which is the LCP equation used for training User u (determining LCP coefficient vector $\rho_u$ using SRS in slots across time and RBs). The estimate of $\rho_u$ is obtained as $\hat{\rho}_u = (S_u^H S_u)^{-1} S_u^H d_u$.

Once the estimate of LCP coefficient vector ρu is determined, we can use it in the prediction mode. Let it be required to decode an uplink Slot $U_{tm+i}$ in RB r where i=1,2,3. As shown in FIG. 2, we are dealing with the slot pattern DSUUU with SRS periodicity of five slots. The nearest special slot to $U_{tm+i}$ containing an SRS symbol is $S_{tm}$. Further let us assume $t_m>t_n$ where $t_n$ is the last special slot containing SRS used in the learning phase. We compute an estimate of $d_{r,tm,u}$ as $$\hat{d}_{r,t_m,u} = S_{r,t_m,u}\hat{\rho}_u \quad (13)$$

The elements of $\hat{d}_{r,t_m,u}$ will denote channel estimates of User u in SRS of Slot $S_{tm}$ for various antennas. We use this channel estimate as the channel estimate of the DMRS in any of the next three uplink slots $U_{tm+i}$, i=1,2,3. While this would be ok for the uplink slot $U_{tm+1}$ immediately after the special slot $S_{tm}$ (referred to as first uplink slot after special slot or FUS), there would be considerable loss of performance for the third uplink slot $U_{tm+3}$ after the special slot $S_{tm}$ (TUS). The LCP Method 2 discussed below addresses this issue of LCP Method 1. An estimate of $H_{DMRS}$ that corresponds to uplink slots $U_{tm+i}$, i=1, 2, 3 and RB r is given as $$\hat{H}_{DMRS}(p,q) = \hat{\omega}_{q,t_m+i,r,p} \approx \hat{d}_{r,t_m,q}(p) \quad (14)$$

which can then be used in combining matrix of CCM-LCP (Split 7.2) or MMSE-CM-LCP (Split 7.2). Note that though $H_{DMRS}$ corresponds to uplink Slot $U_{tm+i}$, i=1,2,3, the calculation can be done any time after special Slot $S_{tm-5}$ and can be sent to RU well ahead of reception of uplink Slot $U_{tm+i}$, i=1, 2, 3. If $\hat{H}_{DMRS} \approx H_{DMRS}$ then we can expect Split 7.2 to perform as well as Split 7.3 (which is what we will see later in this disclosure).

LCP Method 2: As described above, LCP Method 1 only predicts the channel of a user in SRS symbol of a special slot closest to the uplink slot. While this is ok for FUS, there is loss of performance for TUS. LCP Method 2 addresses this issue by reconstructing the channel between two SRS symbols and using the reconstructed channel to build the desired vector $d_{r,t,u}$. In order to perfectly reconstruct the channel between two SRS symbols/special slots, the channel should be sampled at a frequency greater than the Nyquist sampling frequency, which is $2f_D$. Consequently, the distance between two special slots should be less than $_{2F}{}^1D$ which is the Nyquist sampling period, which means reconstruction is possible up to a speed of v=61.7 km/hr at $f_C$=3.5 GHZ carrier frequency.

Let it be required to reconstruct the channel (or the channel estimate) $\omega_{u,t+i,r,a}$ at uplink Slot $U_{t+i}$, i=1, 2, 3 where the nearest special slot preceding it is $S_r$. As per Whittaker-Shanon interpolation and Nyquist-Shannon sampling theorem $$\hat{\omega}_{u,t+i,r,a} = \sum_{n=-\infty}^{\infty} \theta_{u,t+5n,r,a} \text{sinc}\left(\frac{d_i - nT_{SRS}}{T_{SRS}}\right) \quad (15)$$

where $d_i$ is the time between the starts of the SRS symbol in Special slot $S_t$ and first DMRS in uplink Slot $U_{t+i}$, $T_{SRS}$=2.5 ms is the SRS periodicity. Note that to compute the estimate of $\hat{\omega}_{u,t+i,r,a}$, infinite past and future values of $\theta_{u,t+5n,r,a}$ are needed, but we approximate the above summation by using only $B_1$ past and $B_2$ future values. It should be noted that the Nyquist-Shannon sampling theorem is for reconstruction in the time domain, but since time-domain to frequency-domain is a linear transformation, the reconstruction can be applied in frequency-domain as well.

We now discuss the learning/training mode, which can be done only at or after Special slot $S_{t+5B2}$. The desired/predicted vector $\bar{d}_{r,t+i,u}$ is constructed as $$\bar{d}_{r,t+i,u} = \begin{bmatrix} \hat{\omega}_{u,t+i,r,1} \\ \hat{\omega}_{u,t+i,r,2} \\ \vdots \\ \hat{\omega}_{u,t+i,r,N_R} \end{bmatrix} \quad (16)$$

The preliminary LCP equation is $S_{r,t,u} \rho_u = \bar{d}_{r,t+i,u}$. We retain the same definitions for $S_{r,t,u}$, $S_{r,u}$, $S_u$ as discussed above in connection with LCP Method 1, and we i) stack the various $\bar{d}_{r,t+i,u}$ for time instants $t=t_1, t_2, \ldots, t_n$, to arrive at $\bar{d}_{r,u}$ and ii) then stack the various $\bar{d}_{r,u}$ for RBs $r_1, \ldots, r_A$ to arrive at $\bar{d}_u$ as $$\bar{d}_{r,u} = \begin{bmatrix} \bar{d}_{r,t_1+i,u} \\ \vdots \\ \bar{d}_{r,t_n+i,u} \end{bmatrix} \quad \bar{d}_u = \begin{bmatrix} \bar{d}_{r_1,u} \\ \vdots \\ \bar{d}_{r_A,u} \end{bmatrix} \quad (17)$$

We now have the relation $$S_u \rho_u = \bar{d}_u \quad (18)$$

which is the LCP equation used for training User u (determining LCP coefficient vector $\rho_u$).

The estimate of $\rho_u$ is obtained as $\hat{\rho}_u = (S_u{}^H S_u)^{-1} S_u{}^H \bar{d}_u$. Once LCP coefficient vector $\rho_u$ is determined, we can use it in the prediction mode. Let it be required to decode an uplink Slot $U_{tm+i}$ in RB r where i=1,2,3. As shown in FIG. 2, the slot pattern DSUUU with SRS periodicity of five slots is used. The nearest special slot to $U_{tm+i}$ containing an SRS symbol is $S_{tm}$. Furthermore, it is assumed $t_m > t_n + B_2$ where $t_n$ is the last special slot containing SRS used in the learning phase. This will allow for the channel reconstruction at uplink Slot $U_{tm+i}$ and also learning $\rho_u$ using $S_u$, $\bar{d}_u$ at time instants $t_1, \ldots, t_n$. We compute an estimate of $\hat{d}_{r,t_{m+i},u}$ as $$\hat{d}_{r,t_{m+i},u} = S_{r,t_m,u} \hat{\rho}_u \quad (19)$$

The elements of $\hat{d}_{r,t_{m+i},u}$ are the channel estimates of User u in DMRS of uplink Slot $U_{tm+i}$, i=1,2,3, for various antennas. An estimate of $H_{DMRS}$ that corresponds to first DMRS in uplink slots $U_{tm+i}$, i=1, 2, 3 and RB r is given as $$\hat{H}_{DMRS}(p,q) = \hat{w}_{q,t_{m+i},r,p} \approx \hat{d}_{r,t_{m+i},q}(p) \quad (20)$$

which can then be used in combining matrix of CCM-LCP (Split 7.2) or MMSE-CM-LCP (Split 7.2). Note that though $H_{DMRS}$ corresponds to uplink Slot $U_{tm+i}$, i=1,2,3, the calculation can be done any time after special Slot $S_{tm-5}$ and can be sent to RU well ahead of reception of uplink Slot $U_{tm+i}$, i=1, 2, 3.

In the following section, example system models and LCP methods for Split 7.2 in the presence of ICI are discussed (along with MMSE receiver for Split 7.3). The channel of the ith desired user in a Subcarrier s in Resource block (RB) r, Slot t and Antenna a is denoted by $h_{i,t,s,a}$. If Slot t is a special slot, $h_{i,t,s,a}$ corresponds to the SRS OFDM symbol and if it is an uplink slot, it corresponds to the first DMRS of the slot. Similar to the above-noted equation (1), let the received signal in a given OFDM data symbol in uplink Slot $U_{tm+i}$ across the $N_R$ antennas on a given subcarrier s in a given Resource block (RB) r be denoted by the $N_R \times 1$ vector y (for the sake of simplicity, we do not parametrize y, H, x, G, $x_1$, J, $x_2$ and n by the OFDM data symbol index and parameters s, r, $t_m+i$)

$$y = Hx + Gx_1 + Jx_2 + n \quad (21)$$

where H is a $N_R \times N_U$ channel matrix of $N_U$ desired users, x is $N_U \times 1$ vector of desired users, G is a $N_R \times N_{U1}$ channel matrix of $N_{U1}$ intra-site interfering users, $x_1$ is $N_{U1} \times 1$ vector of intra-site interfering users, J is a $N_R \times N_{U2}$ channel matrix of $N_{U2}$ inter-site interfering users, $x_2$ is $N_{U2} \times 1$ vector of inter-site interfering users, and $\tilde{I}$, defined in equation (22) below, $$\tilde{I} = Gx_1 + Jx_2 + n \quad (22)$$

is the total interference. Likewise, let the $N_R \times N_{U1}$ channel matrix of intra-site interferers corresponding to a given Subcarrier S in the given RB r in a SRS symbol in special Slot $S_{tm-5}$ (SRS periodicity is five slots) be denoted by $G_1$. The DU receives signals from RUs of all three sectors/cells in a physical site, so it has access to intra-site channels G but not to inter-site channels J. The quantities $G_{DMRS}$ and $G_{SRS}$ correspond to channel matrix G and $G_1$ of intra-site interferers the same way as $H_{DMRS}$ and $H_{SRS}$ correspond to channel matrix H and $H_1$ as discussed above in connection with LCP methods for Split 7.2 in the absence of ICI.

In this section, MMSE receiver for Split 7.3 is discussed. The interference covariance matrix (ICV) $C_{7.3}$ is given as $$C_{7.3} = E\{\tilde{\eta}\tilde{\eta}^H\} = \frac{1}{12}\sum_{s \in r}\tilde{\eta}\tilde{\eta}^H = \frac{1}{12}\sum_{s \in r}(y - Hx)(y - Hx)^H = \sigma^2 I + \frac{1}{12}\sum_{s \in r}(GG^H + JJ^H) \quad (23)$$

where the expectation operator is implemented by averaging $(y-Hx)(y-Hx)^H$ over the 12 subcarriers in RB r of the first DMRS in uplink Slot $U_{tm+i}$. The quantity x denotes the data vector of desired users corresponding to any Subcarrier s in a RB r and any OFDM data symbol in uplink Slot $U_{tm+i}$. An estimate of x is given as $$\hat{x} = (H_{DMRS}^H C_{7.3}^{-1} H_{DMRS} + I)^{-1} H_{DMRS}^H C_{7.3}^{-1} y. \quad (24a)$$

or alternatively, $$\hat{x} = H_{DMRS}^H (H_{DMRS} H_{DMRS}^H C_{7.3})^{-1} y \quad (24b)$$

In this section, receivers for Split 7.2 are discussed. At the DU, for calculation of $W_{DU}$ as per equation (3), we need to update $\overline{C}$ which is equal to $W_{RU} C_{7.3} W_{RU}^H$ and which is calculated by averaging $(\overline{Y}-\overline{H}x)(\overline{Y}-\overline{H}x)^H$ over the 12 subcarriers in the RB corresponding to first DMRS in received uplink slot at DU. In the above section discussing the LCP methods for Split 7.2 in the absence of ICI, we defined $\theta_{i,t,r,a}$ as the channel estimate of desired User i in RB r, antenna a and channel corresponding to SRS symbol in a special Slot $S_t$. Likewise, we define $\delta_{i,t,r,a}$ as the channel estimate of intra-site interfering User i in RB r, antenna a and channel corresponding to SRS symbol in a special Slot $S_t$. The quantities $\theta_{i,t,r,a}$ and $\delta_{i,t,r,a}$ are considered as the average of the channel values of all subcarriers in a RB. Just as we computed $\hat{H}_{DMRS}$ corresponding to uplink Slot $U_{tm+i}$ in equations (14) and (20) (using LCP Methods 1 and 2 and $\theta_{i,t,r,a}$), we similarly compute an estimate $\hat{G}_{DMRS}$ corresponding to uplink Slot $U_{tm+i}$ using $\delta_{i,t,r,a}$. An estimate of ICM for Split 7.2 is then given by $$C_{7.2} = G_{DMRS} G_{DMRS}^H + \sigma^2 I \quad (25)$$

which is just an approximation to ICV (ICVA) as we use average channel value per RB to compute ICV. A more accurate way of computing the ICV would be to use all channel values per subcarrier in the computation which is done as follows. The channel of the ith intra-site interfering user in a Subcarrier s in Resource block (RB) r, Slot t and Antenna a is denoted by $g_{i,t,s,a}$ (note that the average of $g_{i,t,s,a}$ for all subcarriers s in RB r is $\delta_{i,t,r,a}$). If Slot t is a special slot, $g_{i,t,s,a}$ corresponds to the SRS OFDM symbol and if it is an uplink slot, it corresponds to the first DMRS of the slot. Using LCP method 1, we get an estimate of the channel in Special slot Stm as $\hat{g}_{i,tm,s,a}$ which is a linear combination of gi,tm−5,s,a, . . . , gi,tm−5−5*(ot−1),s,a based on the channel predictor coefficients for the ith intra-site interfering user. This estimate is used as the estimate of the channel in the first DMRS of Uplink slot $U_{tm+i}$, i.e., $\hat{g}_{j,tm+i,s,a} = \hat{g}_{j,tm,s,a}$.

Let us concatenate $\hat{g}_{j,tm,s,a}$ across all antennas as $$\hat{g}_{i,tm,s} = \begin{bmatrix} \hat{g}_{i,tm,s,1} \\ \vdots \\ \hat{g}_{i,tm,s,N_R} \end{bmatrix} \quad (26)$$

The estimate of ICV based on the predicted intra-site interfering channels in the SRS symbol of Special slot $S_{tm}$ is given as $$\hat{C}_{7.2} = \sigma^2 I + \frac{1}{12}\sum_{i=1}^{N_{u1}}\sum_{s \in r}\hat{g}_{i,tm,s}\hat{g}_{i,tm,s}^H \quad (27)$$

Using LCP method 2, we get an estimate of the channel in uplink Slot $U_{tm+i}$ as $\hat{g}_{j,tm+i,s,a}$ which is a linear combination of $g_{j,tm-5,s,a}, \ldots, g_{j,tm-5-5*(ot-1),s,a}$ based on the channel predictor coefficients for the jth intra-site interfering user. Let us concatenate $\hat{g}_{j,tm+i,s,a}$ across all antennas as $$\hat{g}_{j,tm+1,s} = \begin{bmatrix} \hat{g}_{j,tm+i,s,1} \\ \vdots \\ \hat{g}_{j,tm+i,s,N_R} \end{bmatrix} \quad (28)$$

The estimate of ICV based on the predicted intra-site interfering channels in the first DMRS in Uplink slot $U_{tm+i}$ is given as $$\hat{C}_{7.2} = \sigma^2 I + \frac{1}{12}\sum_{j=1}^{N_{u1}}\sum_{s \in r}\hat{g}_{j,tm-t,s}\hat{g}_{j,tm+i,s}^H \quad (29)$$

An estimate of ICV based on SRS symbol in Special slot $S_{tm-5}$ is given as $$\hat{C}_{7.2} = \sigma^2 I + \frac{1}{12}\sum_{i=1}^{N_{u1}}\sum_{s \in r}g_{i,tm-5,s}g_{i,tm-5,s}^H \quad (30)$$

where $$g_{i,tm-5,i} = \begin{bmatrix} g_{i,tm-5,s,1} \\ \vdots \\ \hat{g}_{i,tm-5,s,N_R} \end{bmatrix} \quad (31)$$

The various combining matrices for Split 7.2 are given as follows:
1) MMSE-CM (7.2): The combining matrix $W_{RU} = (H_{SRS}^H \hat{C}_{7.2}^{-1} H_{SRS} + I)^{-1} H_{SRS}^H \hat{C}_{7.2}^{-1}$, where $\hat{C}_{7.2}$ is based on equation (30) and $W_{DU} = I$. or $W_{DU}$ as per equation (3). Alternatively, $W_{RU} = H_{SRS}^H (H_{SRS} H_{SRS}^H + \hat{C}_{7.2})^{-1}$
2) CCM (7.2): The combining matrix $W_{RU} = H_{SRS}^H \hat{C}_{7.2}^{-1}$, where $\hat{C}_{7.2}$ is based on equation (30) and $W_{DU}$ is based on equation (3).
3) MMSE-CM-LCP (7.2): The combining matrix $W_{RU} = (\hat{H}_{DMRS}^H \hat{C}_{7.2}^{-1} \hat{H}_{DMRS} + I)^{-1} \hat{H}_{DMRS}^H \hat{C}_{7.2}^{-1}$, where $\hat{H}_{DMRS}^H$ and $\hat{C}_{7.2}$ are based on equation (14) and equation (27), respectively, for LCP Method 1. For LCP method 2, $\hat{H}DMRS^H$ and $\hat{C}_{7.2}$ are based on equation (20) and equation (29), respectively. Furthermore, $W_{DU} = I$. or $W_{DU}$ as per equation (3). Alternatively, $W_{RU} = \hat{H}_{DMRS}^H (\hat{H}_{DMRS} \hat{H}_{DMRS}^H + \hat{C}_{7.2})^{-1}$ 4) CCM-LCP (7.2): The combining matrix $W_{RU} = \hat{H}_{DMRS}^H \hat{C}_{7.2}^{-1}$, where $\hat{H}_{DMRS}^H$ and $\hat{C}_{7.2}$ are based on equation (14) and equation (27), respectively, for LCP Method 1. For LCP method 2, $\hat{H}_{DMRS}^H$ and $\hat{C}_{7.2}$ are based on equation (20) and equation (29), respectively. Furthermore, $W_{DU}$ is computed as per equation (3).

Some points to be noted regarding the ICV for Split 7.2 and Split 7.3 include the following:

1) The ICV for Split 7.3 in (23) depends on both the intra-site interfering channels (G) and the inter-site interfering channels (J). In functional Split 7.2, the DU has access to only intra-site interferers and not inter-site interferers. Consequently, the ICV for Split 7.2 (using equations (27), (29) and (30)) have contributions from only intra-site interferers but not inter-site interferers. As will be seen in the following sections, the performance of Split 7.2 (with linear channel prediction) can equal the performance of Split 7.3 only in the absence of inter-site interference. When inter-site interference is present, the performance of Split 7.2 consistently falls short of the performance of Split 7.3

2) Note that ICV for Split 7.3 implicitly uses interfering channels at all subcarriers s in a RB r (23). It is for this reason that we have to use linear channel prediction at all subcarriers of intra-site users, as per equations (27), (29) and (30). It might appear that complexity of implementing training and prediction of channels of all intra-site interferers at all subcarriers of a RB is quite costly. However, as will be seen in the following sections, the linear channel predictor coefficients are substantially the same across RBs and slots. Therefore, we need not train the LCP coefficients for all subcarriers in an RB. Instead, we can just train the LCP for some subcarriers, and once trained, the same coefficients can be used in prediction across many RBs.

3) For Split 7.2, we compute the ICV based on LCP-estimated channel of intra-site interferers across all subcarriers in an RB, which needs to be done to match the performance of Split 7.3. The channel at all subcarriers can be calculated by taking the FFT of the received signal divided by the reference signal across subcarriers, separating the various FFT bins of users, and then taking the IFFT of the separated FFT bins.

4) Low complexity implementation of ICV for Split 7.2 is as per equation (25), which implements an approximate ICV (ICVA) based on an average channel across an RB of intra-site interferers.

In this section, some example applications of LCP in the context of Split 7.2 are discussed, as well as some low-complexity implementation alternatives of the techniques discussed above.

Downlink Precoding:

The first example application is downlink precoding. Consider a TDD system with uplink and downlink channel reciprocity. In downlink MU-MIMO, precoding is often employed at the base station (transmitter) to reduce interference in the downlink among many users. As an example, consider a pattern of slots DDDSUDDDSU and Downlink slot $D_{tm+i}$ where the nearest Special slot is $S_{tm}$. The input-output equation at any OFDM data symbol in this slot $D_{tm+i}$, subcarrier s and RB r is given by $$y = HPx + n \quad (32)$$

where x is $N_D \times 1$ vector of downlink data to No users, P is $N_D \times N_D$ precoder at transmitter of base station, H is the $N_D \times N_D$ channel matrix from base station to all $N_D$ UEs, n is AWGN, y is $N_D \times 1$ vector of received signals at $N_D$ users stacked on top of one another. If we select the precoding matrix as $P = H^H(HH)^{-1}$, then the above equation reduces to $y = x + n$, which essentially means no inter-user interference in the downlink among the UEs. However, the base station (e.g., RU) needs to know the channel H in Downlink slot $D_{tm+i}$. The DU has channel estimates at the SRSs of special slots $S_{tm}$, $S_{tm-5}$, . . . , and using these estimates across users and antennas for the given Subcarrier s in the RB r and LCP Method 2, the DU can predict H and send the precoder P to RU well ahead of the transmission of Downlink slot $D_{tm+i}$. Note that LCP Method 1 may not work well if the Downlink Slot $D_{tm+i}$ is quite away from SRS in Special slot $S_{tm}$ (especially for i=2, 3, . . . ), in which case it becomes necessary to use LCP Method 2.

Low-Complexity Implementations:

1) Adaptive Filters: The LCP coefficient vector $\rho_u$ (as discussed above in the section discussing LCP methods for Split 7.2 in the absence of ICI) is learnt via computing an inverse of a $o_t \times o_t$ matrix. An alternative is to use adaptive filters to learn $\rho_u$ (which does not involve any $o_t \times o_t$ matrix inversion). Adaptive filters, e.g., normalized least mean square (NLMS), affine projection (AP) and recursive least squares (RLS) can be used. While the RLS converges quickly compared to NLMS, it is computationally expensive. AP converges as good as RLS at a complexity of NLMS. Adaptive filters can be used across antennas for learning as discussed above in connection with LCP methods for Split 7.2 in the absence of ICI. Learning via adaptive filters needs to be careful as the filter coefficients can diverge in deep fades. Generally, a step-size controller can be employed, which freezes learning in deep fades, employs bigger step size initially so that the filter converges quickly, and in steady state employs a smaller step size so that steady-state error is small.

2) Kalman Filters: Kalman filters are used to study channel estimation. A Kalman filter inherently has a LCP coefficient vector to govern the state equation. As will be seen in the sections below, performance of Split 7.2 is substantially the same as Split 7.3 when LCP prediction order $o_t=7$ (though lower orders such as $o_t=3$ also result in good performances). A Kalman filter performs prediction and correction based on noisy observations, while an LCP does only prediction. A Kalman filter with low order $o_t=1$, 2 as part of its state equation may achieve performances substantially the same as LCP of order $o_t=7$. In that case, the complexity comparisons between the Kalman filter with $o_t=1$, 2 and LCP with $o_t=7$ need to be consider.

3) Fractional Delay Filters: In LCP Method 2, we used Whittaker-Shannon to reconstruct the channel between two SRSs in special slots. This used both future and past SRSs for reconstruction. The number of SRS symbols used on either side of reconstruction can be reduced if one uses fractional delay infinite impulse response (IIR) filters.

4) ICV Updates: The error in the estimate of ICV depends on the prediction order $o_t$. If the prediction order is less (e.g., for complexity reasons), the estimate of ICV has more error, but this error can be accounted for by using the prediction error variance during training of all users. We now describe how it is done. Assume training at Uplink slot $U_{tm+i}$ (this is where the channel is reconstructed in LCP Method 2) and nearest SRS in Special slot is $S_{tm}$. The actual channel of the jth intra-site interferer in Subcarrier s belonging to RB r and Antenna a is denoted, as before, by $g_{j,tm+i,s,a}$. For the sake of simplicity, let us assume a low prediction order $o_r=2$. The estimated channel of the jth intra-site interferer in Subcarrier s belonging to RB r and Antenna a is denoted by $\hat{g}_{j,tm+i,s,a}$. Note that $\hat{g}_{j,tm+i,s,a}$ is a linear combination of $g_{j,tm-5,s,a}$ and $g_{j,tm-10,s,a}$ (SRS periodicity is five slots) and error in prediction is denoted as $e_{j,tm+i,s,a}=g_{j,tm+i,s,a}-\hat{g}_{j,tm+i,s,a}$. Just like equation (28), we concatenate all $g_{j,tm+i,s,a}$ across antennas to give the vector $g_{j,tm+i,s}$. Similarly, we concatenate $e_{j,tm+i,s,a}$ into $e_{j,tm+i,s}$ and $\hat{g}_{j,tm+i,s,a}$ into $\hat{g}_{j,tm+i,s}$. We have $$g_{j,tm+i,s}=\hat{g}_{j,tm+i,s}+e_{j,tm+i,s}. \quad (33)$$

From the definition of LCP, error is orthogonal to input data, i.e., $E\{e_{j,t_{m+i},s,a}\hat{g}^*_{j,t_{m+i},s,a}\}=0$. Furthermore, the channel across antennas is uncorrelated, implying $E\{e_{j,t_{m+i},s,a}\hat{g}^*_{j,t_{m+i},s,b}\}=0$, $a \neq b$. From this and equation (33), it follows $$E\{g_{j,t_{m+i},s}g_{j,t_{m+i},s}^H\}=E\{\hat{g}_{j,t_{m+i},s}\hat{g}_{j,t_{m+i},s}^H\}+\sigma_i^2 I \quad (34)$$

where $E\{e_{j,t_{m+i},s,a}e_{j,t_{m+i},s,a}^H\}=\sigma_i^2$. An estimate of $\sigma_i^2$ is computed as $$\hat{\sigma}_i^2 = \frac{1}{12N_R}\sum_{s \in r} e_{j,t_m+i,s}^H e_{j,t_m+i,s} = \quad (35)$$

$$\frac{1}{12N_R}\sum_{s \in r} (g_{j,t_m+i,s}-\hat{g}_{j,t_m+i,s})^H (g_{j,t_m+i,s}-\hat{g}_{j,t_m+i,s})$$

which is computable as we are in training mode and have access to both $g_{j,tm+i,s}, \hat{g}_{j,tm+i,s}$. The ICV for Split 7.2 based on $\hat{g}_{j,tm+i,s}$ is given by equation (29) while the ICV for Split 7.2 based on actual channel value $g_{j,tm+i,s}$ is $$\hat{C}_{7.2} = \sigma^2 I + \frac{1}{12}\sum_{j=1}^{N_{u_1}}\sum_{s \in r} g_{j,t_m+i,s}g_{j,t_m+i,s}^H. \quad (36)$$

So, it follows from equation (34) that the updated version of equation (29) is $$\hat{C}_{7.2} = \sigma^2 I + \frac{1}{12}\sum_{j=1}^{N_{u_1}}\sum_{s \in r} g_{j,t_m+i,s}g_{j,t_m+i,s}^H + \sum_{j}^{N_{u_1}} \sigma_i^2 I. \quad (37)$$

5) LCP Coefficients: LCP coefficient vector $\rho_u$ depends on the channel variation across time. This in turn is dependent on delays, scattering, angle of arrival at base station, speed etc. To a large extent, it can be dependent on speed of the UE. In that case, we can find speed of the UE by computing power spectral density of SRS symbols and then using a look-up table to determine the LCP coefficient of a given order. We then do not have to spend resources in learning, and we can just use the coefficients directly in prediction.

6) Training in FFT Domain: Due to frequency selectivity, channel across subcarriers varies slowly. If we take a 12-point FFT of the channel in an RB, it can be accurately represented by a few FFT bins only, e.g., FFT bins 1, 2, 3, 11, and 12 (bin index starts at 1). If frequency-selectivity is less, it can even be represented by FFT bins 1, 2, and 12, for example. Now if we take the IFFT of these FFT bins (other bins being zero), the channel across subcarriers in the RB can be represented quite accurately with around 5% error. In general, for multi-RB, we can take FFT of all subcarriers across the RBs, and use only very few FFT bins. To get subcarrier-by-subcarrier channel and separate the multi-users, we need to get into FFT domain, so we can learn on the selected reduced FFT bins and then reconstruct the channels at subcarriers over the RBs.

SRS Channel Estimation:

In an example method, we take FFT of raw channel across subcarriers, drop some FFT bins which correspond to noise and retain only the low-pass FFT bins corresponding to the channel, and then generate IFFT. This is called denoising, which works because the channel varies as a low-pass signal across subcarriers. We can extend this to two dimensions for SRS, i.e., time and frequency. The channel across various SRS also varies slowly (depends on Doppler and a low-pass signal). So, if we take a 2D-FFT of raw SRS channel (received signal divided by reference sequence), we can separate the various users in 2D-FFT domain, remove the noise 2D-FFT bins, and then generate IFFT to obtain SRS channel estimations across various SRS OFDM symbols/RBs for each user.

Delay-Doppler-Based Channel Prediction and SRS Capacity Improvement:

Delay-Doppler-based channel prediction is implemented when we have modeled all the multipath channel taps along with delays. These channel taps can be tracked and predicted like the channel prediction described in the present disclosure. The key aspect is at any time a set of frequency subcarriers can be converted into time-domain multipath channel taps (the channel taps of many users derived from the same subcarriers can be separated.). These channel taps are computed for every SRS symbol and learning/prediction can happen for each channel tap. The Doppler associated with each channel tap can vary, but we can assume the Doppler to be constant for a few taps and learning can happen for selected few channel taps only, and the prediction be used on all channel taps (based on learning of some selected taps). Once the future channel taps are predicted/estimated, we can reconstruct/predict the channel in any RB. In present disclosure, we use full-band scheduling. However, with the proposed usage of linear prediction in time domain of channel taps, sub-band scheduling can be employed as one can estimate/update the channel taps in time domain from any sub-band. This will increase the SRS capacity, but is computationally expensive.

Simulation Results:

The channel model used in these simulations corresponds to CDL-B (see, e.g., 3GPP TR 38.901, "Study on Channel Model for Frequencies from 0.5 to 100 GHz," 3GPP, V14.3.0, December 2017). Furthermore, we assume that v=30 km/hr, $f_C$=3.5 GHZ, $N_R$=64, NU=4, delay spread (ds) is 1000 ns. The delay spread corresponds to the highest value in Table 7.7.3-1 in 3GPP TR 38.901, "Study on Channel Model for Frequencies from 0.5 to 100 GHz," 3GPP, V14.3.0, December 2017. This means the frequency-selectivity is the highest and the variation of $H_{DMRS}$ w.r.t H in equation (1) is the largest. Furthermore, we assume perfect channel estimation, i.e., we have perfect knowledge of $H_1$, H in equation (1). We assume a 4×8×2 panel of antennas with four in vertical direction, eight in horizontal direction and two cross polarized antennas in each location. We consider the DSUUU pattern, 30 kHz subcarrier spacing, where each slot is 0.5 ms in duration and $T_{SRS}$=2.5 ms (SRS periodicity of five slots).

Figure 4:
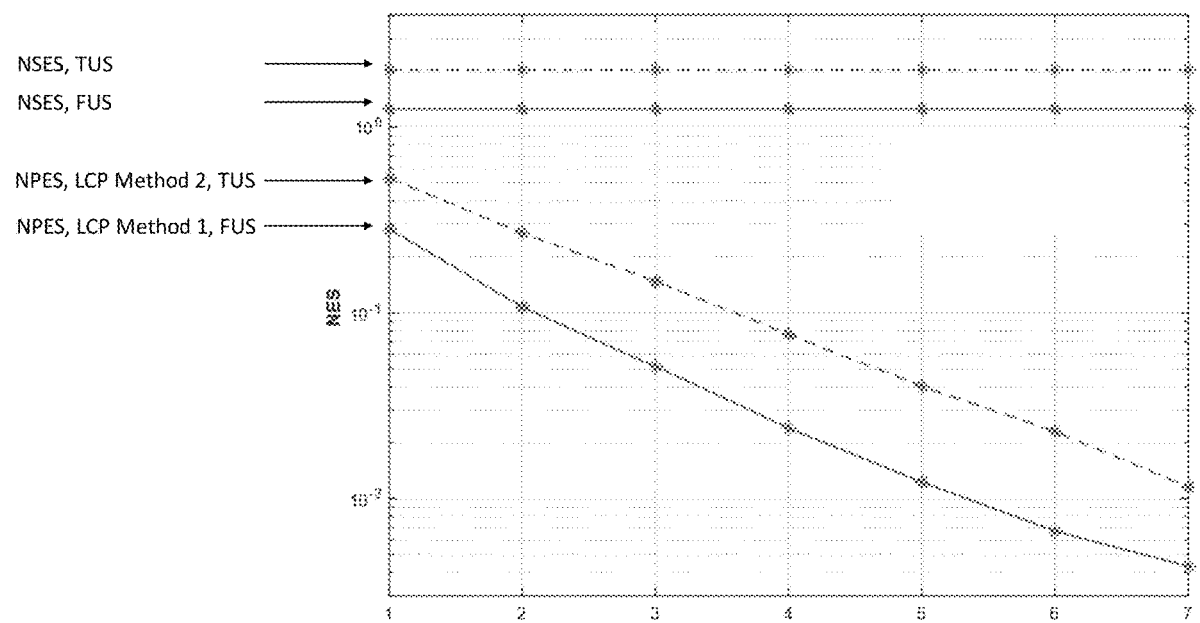
FIG. 4 illustrates the effect of using predictions of both LCP methods vs. not using the LCP methods.

FIG. 4 illustrates the effect of using predictions of both LCP methods vs. not using the LCP methods, which FIG. 4 uses plots of the normalized error square (y-axis labeled as NES) vs. prediction order or (on the x-axis). Assume we are detecting an uplink Slot $U_{tm+i}$ and the nearest preceding special slot is $S_{tm}$. The prediction error is defined as the difference in the actual channel $\omega_{u,tm+i,r,a}$ value and predicted value. The predicted values are $p_{u,tm+i,r,a}=\omega^{\wedge}_{u,tm+i,r,a}$ and $p_{u,tm+i,r,a}=\theta^{\wedge}_{u,tm,r,a}$, for LCP Method 1 and 2, respectively. The SRS error is defined as the difference in the actual channel value and value of the channel at $S_{tm-5}$. The normalized prediction error square (NPES) is defined as the ratio of expectation of the square of the absolute value of the prediction error to the expectation of the square of the absolute channel value. The expectation is with respect to users (all users have same speed and hence we assume the same random process statistically), antennas, RBs and across time slots. The normalized SRS error square (NSES) is defined as the ratio of expectation of the square of the absolute value of the SRS error to the expectation of the square of the absolute channel value. The resulting equations for NPES and NSES are as follows:

$$NPES = \frac{\sum_i \sum_{t_{m+1}} \sum_r \sum_u |p_{u,t_{m+1},r,a} - \omega_{u,t_{m+1},r,a}|^2}{\sum_i \sum_{t_{m+1}} \sum_r \sum_u |\omega_{u,t_{m+1},r,a}|^2}$$

$$NSES = \frac{\sum_i \sum_{t_{m+1}} \sum_r \sum_u |\theta_{u,t_{m+1},r,a} - \omega_{u,t_{m+1},r,a}|^2}{\sum_i \sum_{t_{m+1}} \sum_r \sum_u |\omega_{u,t_{m+1},r,a}|^2}.$$

Note that, but for the LCP methods, we will have to use the channel estimate of the of the SRS at $S_{tm-5}$. As shown in FIG. 4, the NSES is quite high compared to NPES, and it is evident the LCP methods improve the performance by reducing the NPES relative to the NSES. NPES for LCP method 2 is worse than that of LCP method 1 as there is reconstruction error associated with the learning.

Figure 5:
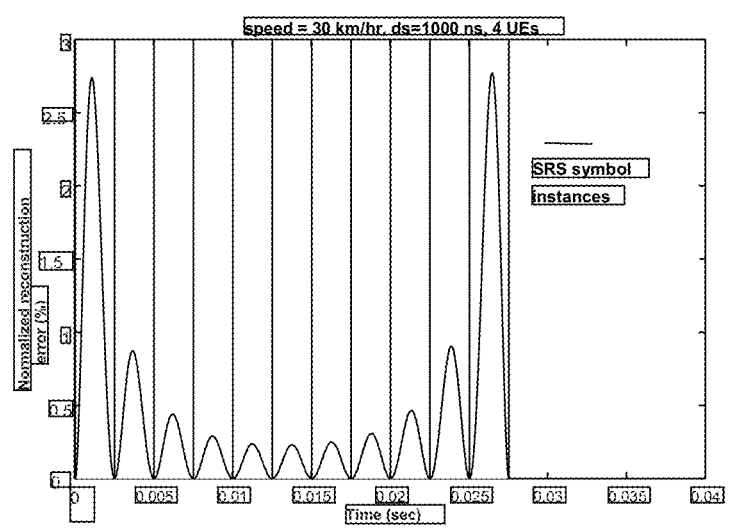
FIG. 5 illustrates channel reconstruction error associated with Nyquist sampling/reconstruction of LCP Method 2.

FIG. 5 depicts the normalized reconstruction error using Whittaker-Shanon interpolation and Nyquist-Shannon sampling theorem, e.g., for LCP Method 2. We consider 771 OFDM symbols or 56 slots (0.0275 s). Beginning from the first OFDM symbol, every 70th OFDM symbol is an SRS symbol that is known. Using only the channel estimates (perfect) of the SRS symbols the channel estimates of all the OFDM symbols are reconstructed using Whittaker-Shanon interpolation and Nyquist-Shannon sampling theorem. The channel estimates are denoted by x(n,i,a), n=0, . . . , 771, where i is the iteration index, a is the antenna index and n is the OFDM symbol index. For the sake of simplicity, we assume only one user. The reconstructed channel estimates are denoted by x^(n,i,a),n=0, . . . , 771. The normalized reconstruction error square is defined as $|x^{\wedge}(n,i,a)-x(n,i,a)|^2$ $$NRES(n) = \frac{\sum_a \sum_i |\hat{x}(n, i, a) - x(n, i, a)|^2}{\sum_i |x(n, i, a)|^2}. \tag{39}$$

The channel estimate at the middle is as small as 0.5%. Each iteration is over an RB (one channel estimate per RB) and 56 slots. A time-frequency observation of 50 RBs and 105 slots was used. A sliding window of 56 slots was used as we move from one iteration to another in the time domain.

Figure 6:
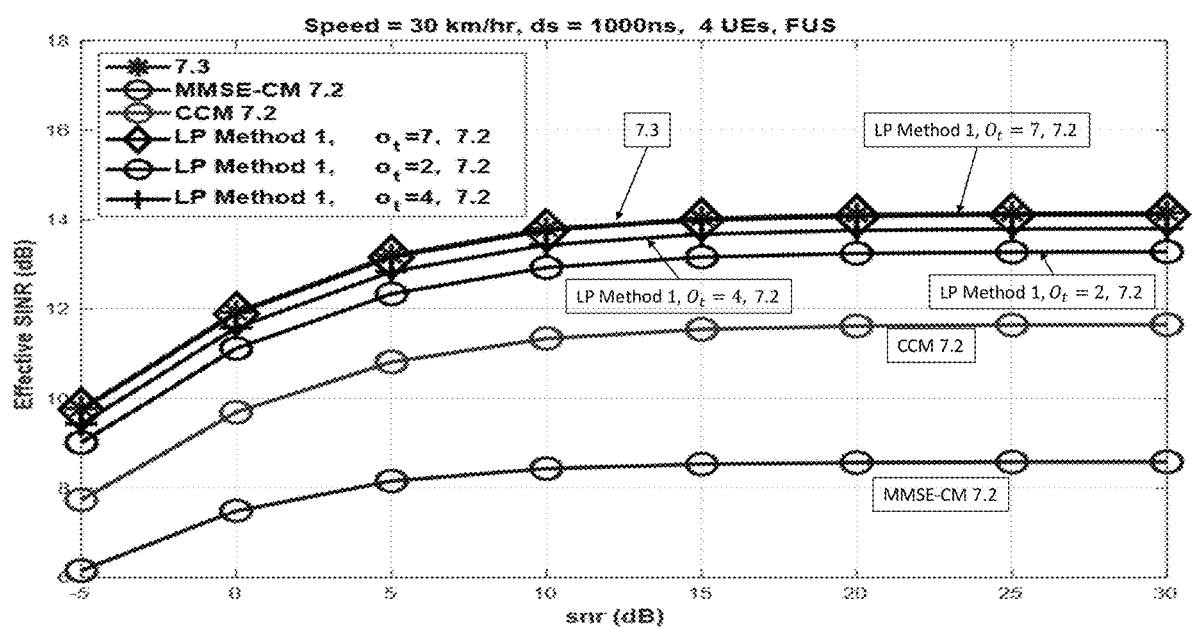
FIG. 6 illustrates Split 7.3 and Split 7.2 having same performance and compares it with other methods for FUS.
Figure 8:
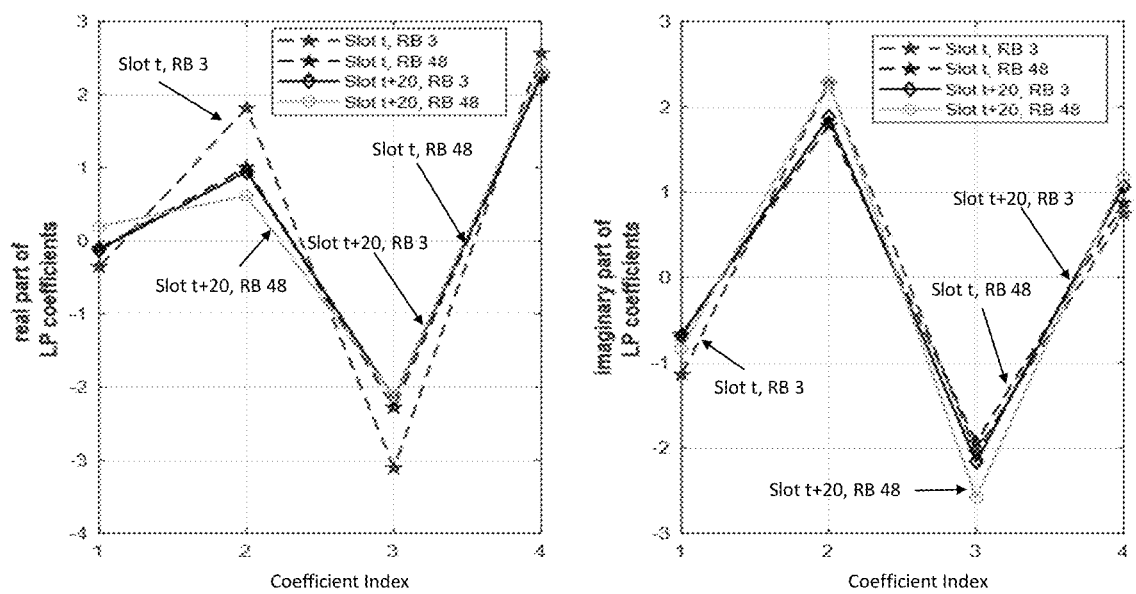
FIG. 8 illustrates the comparisons between LCP Methods 1 and 2 for FUS and TUS.

FIGS. 6 and 8 depict performance comparisons of various methods discussed in the present disclosure. The simulation corresponds to 2000 iterations. The dataset for each iteration is from one RB over 13 special slots (SRS symbols) followed by three uplink slots (the three uplink slots are just after the 13th special slot). The datasets for iterations first vary over a channel bandwidth of 50 RBs while the time domain slots are held constant and then a sliding window that slides by five slots (SRS periodicity) is used to move in the time domain to get the next 50 datasets for iterations over the channel bandwidth of 50 RBs. We use prediction order $o_f=7$. In any dataset (iteration) that requires learning, the first eight special slots (SRS) are used for training. Learning is over only one RB and one time instant, i.e., $r_1=r_A$, $t_1=t_n$. For every 400 iterations, we use LCP coefficients learnt in the first of the 400 iterations. This is ideal from a complexity and scheduling viewpoint as we can learn in one RB and time slot and use it to predict in another RB and time slot. At the time of learning, we do not know where (in which RB) the user will be scheduled in future. In each dataset, the channel estimates of the first 12 SRS symbols in the RB is used to reconstruct the channel estimate of all OFDM symbols between the first SRS symbol and 12th SRS symbol (a region of 56 slots or 770 OFDM symbols). The prediction in any dataset (iteration) uses channel estimates of SRS symbols from special slots six to 12, to predict the channel estimate in the SRS symbol of the 13th special slot (LP Method 1) or the channel estimate of the first DMRS of any of the three uplink slots following the 13th special slot (LP method 2). Mathematically, the dataset for the kth iteration is taken from RB r=k mod 50 and Slots $$S_{t+5\lfloor \frac{k}{50} \rfloor}, S_{t+5\lfloor \frac{k}{50} \rfloor+5}, \ldots, S_{t+5\lfloor \frac{k}{50} \rfloor+55}, S_{t+5\lfloor \frac{k}{50} \rfloor+60},$$

$$U_{t+5\lfloor \frac{k}{50} \rfloor+61}, U_{t+5\lfloor \frac{k}{50} \rfloor+62}, U_{t+5\lfloor \frac{k}{50} \rfloor+63}.$$

In FIG. 6, which corresponds to only FUS, we can see that the MMSE-CM 7.2 method has the worst performance as it is entirely based on a 2.5 ms (or five slots) old SRS value. The CCM 7.2 method has improved performance compared to MMSE-CM 7.2 method as it is partly based on an old SRS channel estimate (only $W_{RU}$ part is based on the 2.5 ms (or five slots) old SRS value, while the $W_{DU}$ part is based on the effective channel matrix H⁻ DMRS corresponding to the first DMRS of the uplink slot being decoded). Both methods, however, have a big performance gap relative to the Split 7.3 method. The LCP Method 1 for prediction order of seven exactly matches the performance of Split 7.3 method (i.e., the upper bound) for FUS, thereby overcoming the channel aging and fronthaul constraints. This matching of the upper bound of Split 7.3 method via LCP is one of the goals of the present disclosure. FIG. 6 also shows LCP Method 1 performances for prediction orders $o_f=2, 4$, and these are close to the upper bound of the Split 7.3 method, and much better than MMSE-CM 7.2 and CCM 7.2, thereby emphasizing the importance of the LCP methods.

FIG. 8 illustrates the comparisons between LCP Methods 1 and 2 for FUS and TUS. As discussed previously, LCP Method 1 (Split 7.2) works well for FUS and attains the same upper bound performance of Split 7.3 method. However, LCP method 1 will exhibit loss of performance for TUS, while LCP Method 2 attains the same performance as Split 7.3 method, as shown in FIG. 8.

Figure 7:
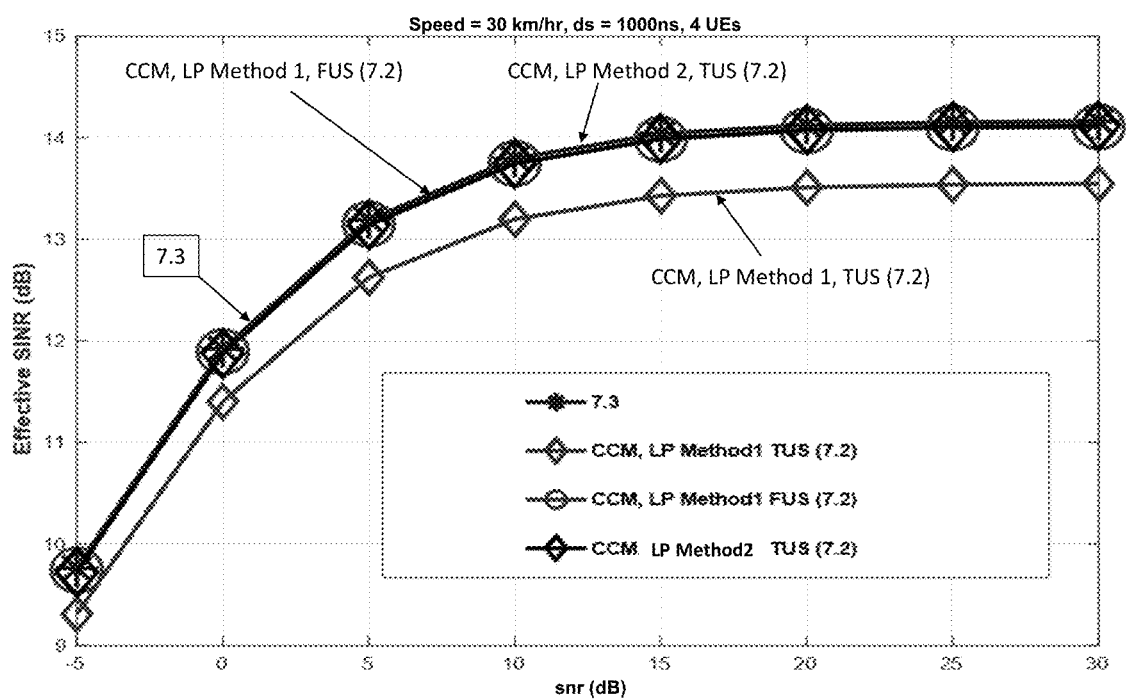
FIG. 7 illustrates that LCP Method 2 overcomes limitations of LCP Method 1 for TUS.

Ideally, one can learn the LCP coefficients across time, RBs and antennas as given in equation (12). The channel is a random process characterized by Doppler spread $f_D$ which is dependent on the speed of the UE v and carrier frequency $f_C$. The channels at various RBs and antennas can be considered to be realizations of the same random process. Doppler spread which is dependent on speed and carrier frequency is expected to change little across the RBs, as change in frequency from RB to RB is very little compared to carrier frequency. Consequently, we assume that LCP coefficients are constant across RBs, antennas and time, as shown in FIG. 7.

For O-RAN massive MIMO systems, there is a loss of performance of Split 7.2 relative to Split 7.3 for mobility use cases in the uplink when conventional methods are used. The two example linear channel prediction methods provided in the present disclosure overcome this loss of performance of Split 7.2 and help the Split 7.2 systems achieve substantially the same performance as Split 7.3 systems. Results for four uplink users at speeds of 30 km/hr at a carrier frequency of 3.5 GHz showed that Split 7.2 achieved the same performance as Split 7.3 systems, as illustrated in FIG. 7. FIG. 7 additionally illustrates that LCP Method 2 overcomes the limitations of LCP Method 1 for TUS.

In summary, several example embodiments of the method according to the present disclosure are listed below:

1) Learning and predicting channel at each subcarrier in a future SRS symbol from present and past channel values at subcarriers of past and present SRS symbols for each user (desired and intra-site) using LP Method 1.
2) Learning and predicting average of channels across subcarriers in a RB for a future SRS symbol from present and past such average values corresponding to past and present SRS symbols for each user (desired and intra) using LP Method 1.
3) Learning and predicting channel at each subcarrier in a future PUSCH symbol from present and past channel values at subcarriers of past and present SRS symbols for each user (desired and intra) using LP Method 2.
4) Learning and predicting average of channels across subcarriers in a RB for a future PUSCH symbol from present and past such average values corresponding to past and present SRS symbols for each user (desired and intra) using LP Method 2.
5) Using the Method of 1) above to compute ICV.
6) Using the Method of 2) above to compute ICV.
7) Using the Method of 3) above to compute ICV.
8) Using the Method of 4) above to compute ICV.
9) Using Method of 2) above to compute desired Channel matrix.
10) Using Method of 4) above to compute desired Channel matrix.
11) Using any of Methods 5)-8) for ICV in conjunction with any of Methods 9)-10) for channel matrix of desired users to decode desired users as per equation (24).
12) For determining LCP coefficients of any user, learning can be done at only one subcarrier and this can be used for prediction across RBs and time domain slots.
13) Use of LCP methods for downlink precoding for MU-MIMO.
14) The use of adaptive filters to determine LCP coefficients.
15) The use of Kalman filters to determine LCP coefficients.
16) The use of fractional delay IIR filters for reconstruction in LP Method 2.
17) The use of Nyquist sampling for reconstruction in LP Method 2.
18) Updating ICV corresponding to a lower prediction order to a more accurate version.
19) Determining speed of users and using a LUT to determine LCP coefficients.
20) Taking FFT of raw channel estimates across subcarriers, and using linear prediction only on a subset of FFT bins, predicting those FFT bins and in turn reconstructing predicted channels across subcarriers for many RBs and multiple users.
21) Going from frequency-domain to time domain and computing multipath tap channel values. Using LCP on the time domain taps and predicting future time domain taps, thereby being in a position to compute the channel for any RB in a future time domain slot. Using this to improve SRS capacity via sub-band scheduling.
22) Using 2D-FFT for SRS channel estimation.
23) A method of linear channel prediction (LCP) in an Open Radio Access Network (O-RAN) massive Multiple Input Multiple Output (MIMO) system, comprising: predicting a channel corresponding to a sounding reference signal (SRS) symbol closest to a target uplink (UL) slot to be decoded, wherein said predicting is performed based on at least one previous SRS symbol; and using the predicted channel as a combining matrix to be applied in a radio unit (RU) for decoding the target UL slot.
24) A method of linear channel prediction (LCP) in an Open Radio Access Network (O-RAN) massive Multiple Input Multiple Output (MIMO) system, comprising: i) reconstructing a channel between the two periodic SRS symbols using past and future SRS symbols; ii) training for predicting a channel between two periodic SRS symbols; and iii) using the predicted channel corresponding to the UL slot located between the slots containing the two periodic SRS symbols and decoding the UL slot using a combining matrix based on the predicted channel.

Definitions

3GPP 3rd Generation Partnership Project
5G NR TDD 5G New Radio Time-Division Duplex.
AWGN Additive White Gaussian Noise
ADC Analog to Digital Converter
BS Base Station
CE Channel Estimation
CP Cyclic Prefix
CSF Current Subframe
CSI Channel State Information
DL Downlink
DMRS Demodulation Reference Signals
DU Distributed Unit
eNB eNodeB
FEC Forward Error Correction
FFT Fast Fourier Transform
FH Fronthaul
GSMA Global System for Mobile Communications Association
IFFT Inverse Fast Fourier Transform
IQ In-phase/Quadrature-phase
IRC Interference Rejection Combining
LTE Long-Term Evolution
LCP Linear Channel Prediction
MAC Medium Access Layer
MIMO Multiple Input Multiple Output mMIMO Massive MIMO
MMSE Minimum Mean Squared Error
MU-MIMO Multi-User MIMO
NG-RAN Next Generation Radio Access Network
Orthogonal Frequency Division Multiplexing
OFDM O-DU Open Distributed Unit
O-RAN Open Radio Access Network
O-RU Open Radio Unit
PUSCH Physical Uplink Shared Channel
RAN Radio Access Network
RB Resource Block
RF Radio Frequency
SF Subframe
SFN System Frame Number
SRS Sounding Reference Signals
SSF Special Subframe
TDD Time division duplex
UE User Equipment
UL Uplink

What is claimed:

1. A method of linear channel prediction (LCP) in an Open Radio Access Network (O-RAN) massive Multiple Input Multiple Output (MIMO) system, comprising:
  predicting a channel associated with a target uplink (UL) slot to be decoded, wherein said predicting is performed based on at least one previous SRS symbol, and wherein said predicting comprises: i) training for predicting a channel between two periodic SRS symbols; and ii) decoding the target UL slot using a combining matrix based on a predicted channel corresponding to the target UL slot located between slots containing the two periodic SRS symbols;
  using the predicted channel as a basis for a combining matrix to be applied in a radio unit (RU) for decoding the target UL slot;
  prior to the training for predicting, sampling a channel between two periodic SRS symbols for reconstructing the channel between two periodic SRS symbols, wherein fractional delay infinite impulse response (IIR) filter is used for reconstructing the channel between two periodic SRS symbols.

2. The method according to claim 1, wherein the sampling the channel is performed at a frequency greater than the Nyquist sampling frequency.

3. The method according to claim 1, wherein prediction coefficients are obtained by the training.

4. The method according to claim 3, wherein the prediction coefficients are learned by an adaptive filter configured as one of a normalized least mean square (NLMS) filter, affine projection (AP) filter, and recursive least squares (RLS) filter.

5. The method according to claim 3, wherein the prediction coefficients are learned by a Kalman filter.

* * * * *